Aug. 7, 1945.   G. B. CARROLL   2,381,721
AIRPLANE AILERON CONTROL
Filed Dec. 27, 1943   3 Sheets-Sheet 1

INVENTOR
Guy B. Carroll
By his Attorney
Harry N. Kilgore

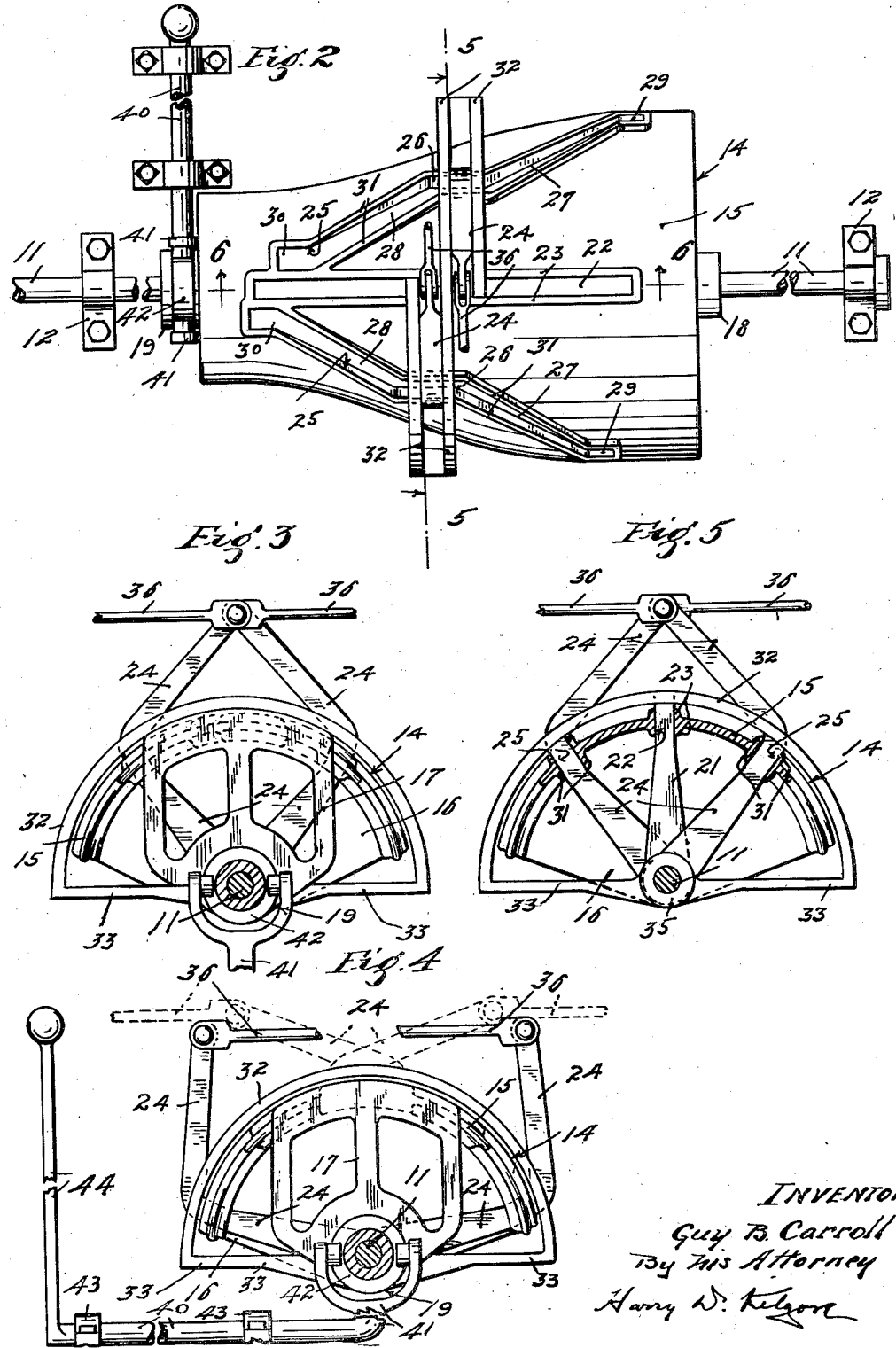

Aug. 7, 1945.   G. B. CARROLL   2,381,721
AIRPLANE AILERON CONTROL
Filed Dec. 27, 1943   3 Sheets-Sheet 3
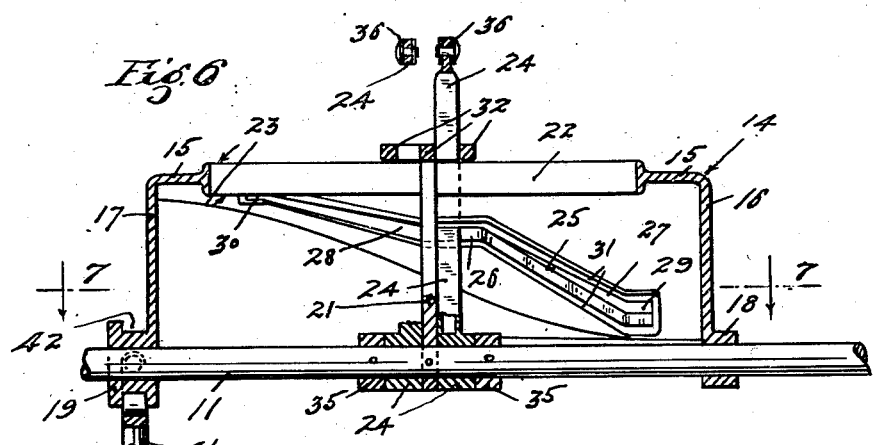
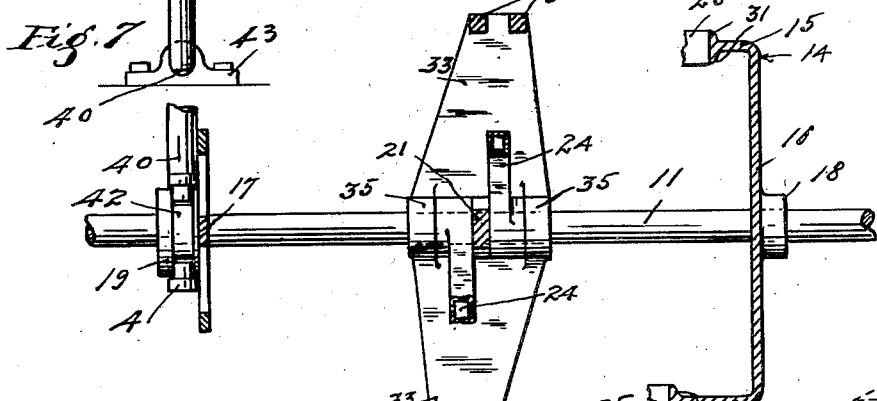
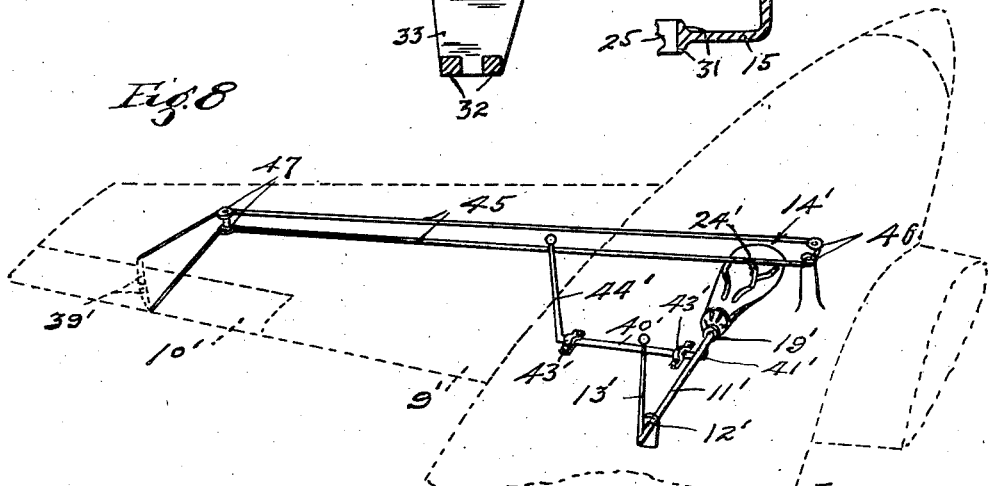
INVENTOR
Guy B. Carroll
By his Attorney
Harry N. Kilgore Patented Aug. 7, 1945

2,381,721

UNITED STATES PATENT OFFICE 2,381,721

AIRPLANE AILERON CONTROL

Guy B. Carroll, Minneapolis, Minn.

Application December 27, 1943, Serial No. 515,846

11 Claims. (Cl. 244—83)

My present invention relates to improvements in airplane aileron controls.

The objects of this invention are: first, to utilize the ailerons of an airplane as flaps for retarding the landing speed in addition to maintaining lateral control; second, to bring an airplane out of a spin; and third, to facilitate the landing of an airplane onto a small field surrounded by high obstructions.

Other objects of the invention will be apparent from the following description, reference being had to the accompanying drawings.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 2 is a fragmentary plan view of the aileron control on an enlarged scale;

Fig. 3 is a left-hand end elevation of the aileron control, as shown in Fig. 2;

Fig. 4 is a view corresponding to Fig. 3 but showing the cam shifted to separate the levers and also showing the levers, by means of broken lines, drawn toward each other in crossed arrangement;

Fig. 5 is a view corresponding to Fig. 3 with the exception that some parts are sectioned on the irregular line 5—5 of Fig. 3;

Fig. 6 is a view partly in side elevation and partly in vertical section taken on the line 6—6 of Fig. 2;

Fig. 7 is a view partly in plan and partly in horizontal section taken on the line 7—7 of Fig. 6; and Fig. 8 is a fragmentary plan view of an airplane diagrammatically illustrated by means of broken lines and also showing by means of full lines a slight modification of the aileron control.

Figure 1:
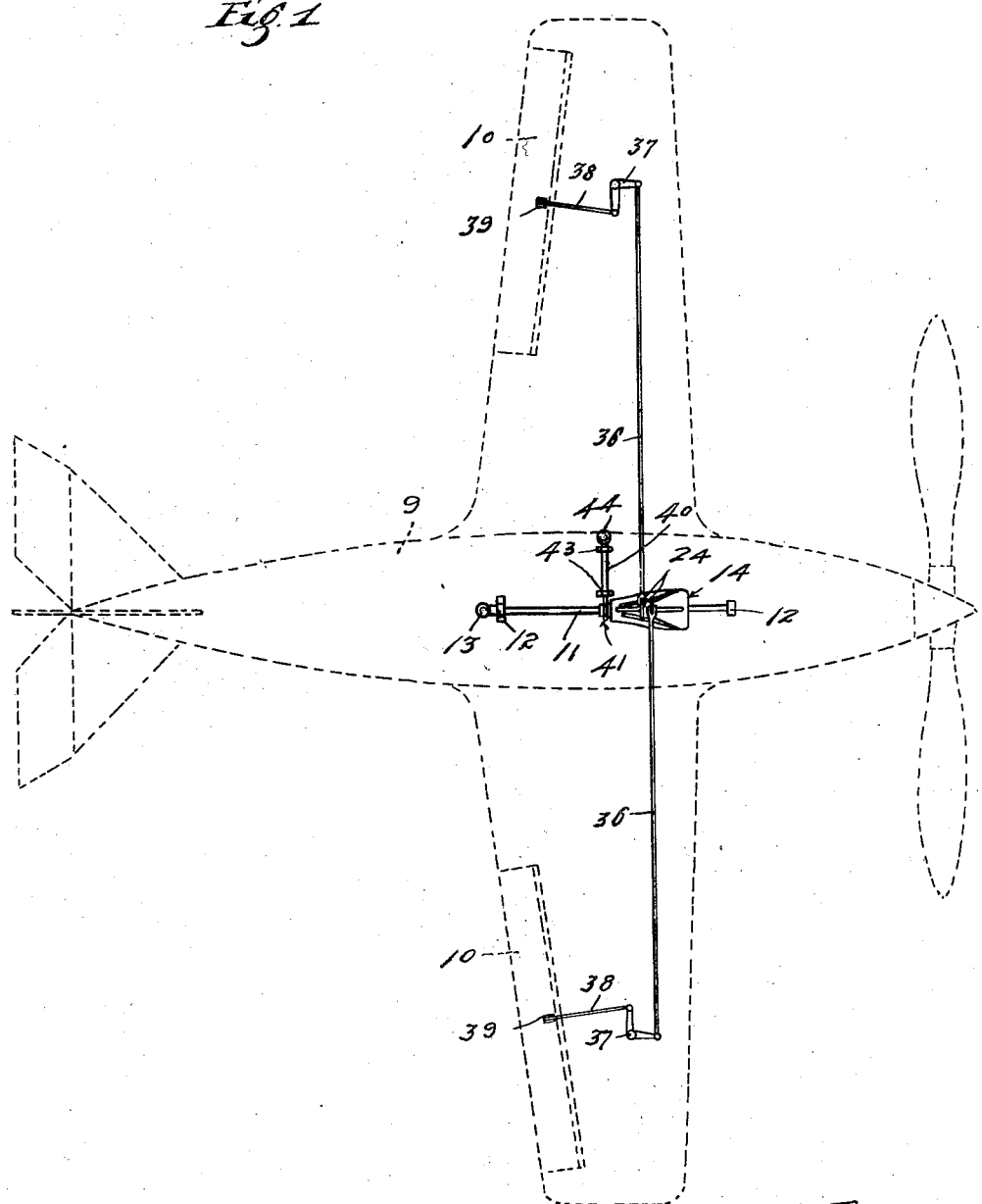
Fig. 1 is a plan view of an airplane diagrammatically illustrated by means of broken lines and having the improved aileron control embodied therein.

Referring first to the invention shown in Figs. 1 to 7, inclusive, the numeral 9 indicates an airplane, as an entirety, with the exception of its ailerons 10 which are hinged to the wings for raising or lowering movements.

A rock shaft 11 extends longitudinally of the airplane 9 and is journaled in bearings 12. An upstanding lever 13, commonly called a "stick," is applied to the outer end portion of the shaft 11 and by which lever the said shaft may be rocked, for a purpose which will presently appear.

A cam 14 having a horizontally disposed body member 15 is mounted on the shaft 11. This cam 14 is semi-cylindrical in cross-section and tapered from its front end to its rear end. The under or flat side of the body member 15, which is open, lies in a horizontal plane when the cam 14 is in normal position. This body member 15 has front and rear end members 16 and 17, respectively, provided with hubs 18 and 19, respectively, through which the shaft 11 loosely extends and supports the cam 14 with freedom for endwise sliding movement thereon.

An upstanding arm 21 having on its lower end a hub through which the shaft 11 projects, is secured to said shaft by a pin, see Fig. 6. This arm 21 extends through a straight longitudinal guide slot 22 in the top of the cam body 15 at the transverse center thereof. The arm 21 holds the cam 14 for common rocking movement with the rock shaft 11 and also holds said cam for straight endwise sliding movement on said shaft, either forward or back from normal position. Inner and outer flanges 23 on the body member 15 surround the guide slot 22 and, together with said body member, afford wide bearing surfaces for the arm 21. These flanges 23 also reinforce the body member 15.

A pair of levers 24 are loosely pivoted, side by side, on the rock shaft 11 and held against axial movement thereon, as will presently appear. Each lever 24 is in the form of an angle, substantially a right angle, and the elbows of the two levers 24 extend outwardly and away from each other, see Fig. 3. A pair of cam slots 25 is formed in the body member 15 and extend longitudinally thereof, one on each side of the guide slot 22. These cam slots 25 have intermediate sections 26 that are parallel to each other and to the guide slot 22 and hold the levers 24 in normal positions and in which positions the ailerons 10 are also in normal positions.

The major portions of the front sections 27 of the cam slots 25 are in diverging relation from the intermediate sections 26 thereof and the major portions of the rear sections 28 of the cam slots 25 are in converging relation from said intermediate sections 26. The extreme front and rear end sections 29 and 30, respectively, of the cam slots 25 are parallel to each other and the guide slot 22. Inner and outer flanges 31 on the cam body member 15 surround the cam slots 25 and, together with said body member, afford wide bearing surfaces for the levers 24. The ends of the cam slots 25 afford stops that engage the levers 24 and limit the endwise sliding movement of the cam 14 on the shaft 11. By reference to Fig. 5, it will be noted that the levers 24 where they pass through the cam slots 25, as well as the respective sections of said slots, are substantially perpendicular to the longitudinal axis of the rock shaft 11. Said levers 24 are tubular and rectilinear in cross-section.

Outwardly of the cam 14 the levers 24 work between circular guide bars 32 that are concentric with the cam 14 and are held thereby against lateral movement. These guide bars 32, at their ends, are rigidly secured to a horizontally disposed plate 33 having hubs 35 through which the shaft 11 extends. The plate 33 and hence the guide bars 32 are held for common rocking movement with the shaft 11 and cam 14 by having their hubs 35 secured to said shaft by pins, see Fig. 6. The hubs of the levers 24 are held against axial movement on the rock shaft 11 by the hub of the guide arm 21 and the hubs 35 of the plate 33 between which they project.

Operating connections from each lever 24 to one of the ailerons 10 comprise a long rod 36, a bell-crank 37 and a short rod 38. These rods 36 are pivotally attached at one of their ends to the outer ends of the levers 24 and their other ends are pivotally attached to one of the arms of the bell-cranks 37. The short rods 38 connect the other arms of the bell-cranks 37 to horns 39 on the ailerons 10. As shown in Fig. 1, the right-hand lever 24 is connected to the left-hand aileron 10 and the left-hand lever 24 is attached to the right-hand aileron 10.

Endwise movement is imparted to the cam 14 either forward or backward from its normal position by a rock shaft 40 having at one end a rigid arm 41 having a bifurcated outer end that extends into an annular channel 42 in the hub 19. The rock shaft 40 is mounted in bearings 43 and has on its outer end an upstanding lever 44.

Referring now to the modification shown in Fig. 8. The construction is the same as that shown in Figs. 1 to 7, inclusive, except that cables 45, only one of which is shown, are used in place of rods 36. In this modification, parts that are identical with like parts in Figs. 1 to 7, inclusive, are given the same reference numerals followed by a prime ('). Each operating lever 24' is connected to one of the ailerons by one of the cables 45 which is attached at its end portions to upper and lower horns 39' on the respective aileron 10'. The cable 45 at its intermediate portion runs over a pair of pulleys 46 on the airplane 9 and on the opposite side of the cam 14' from the respective aileron 10'. One section of the cable 45 is attached to one of the levers 24'. The end portions of the cable 45 at the respective aileron 10' run over directional pulleys 47.

My improved airplane aileron control maintains, under all conditions of operation, the normal relation of the ailerons to each other, that is the present control stick or wheel movement imparts opposite direction of motion to ailerons on opposite wings for the maintenance of lateral control.

In addition to the lateral control, my invention provides for either forward or backward movement of the cam 14 from normal position by manipulating the lever 44 to either raise or lower opposite ailerons 10 simultaneously for additional control, either to decrease the landing speed of the plane or to stop the plane from spinning. This control of the ailerons 10 by the cam 14 will materially assist in landing a plane on a small field surrounded by tall buildings or other high obstructions. My aileron control, when applied to an airplane equipped with flaps, will act as additional flaps or air brakes.

To bring a plane out of a spin, the cam 14 is manipulated to raise the ailerons and the stick 13 manipulated to rock the cam 14 and lift the lower inner wing of the plane. There is no interference of the two controls described, the one with the other, when used separately or simultaneously. This dual operation of the controls will position the aileron on the high outer wing above the respective wing and the aileron on the low inner wing will be in normal position in which it forms a symmetrical part of the wing. In this position, the lower inner wing is subjected to no additional drift or drag while the high outer wing is forced down and back by its high aileron— the exact positions necessary to stop spinning. Heretofore, these positions of the ailerons have been impossible of attainment. High outer and low inner wings refer to the plane position while spinning.

The above described control for the ailerons of an airplane are equally well adapted for use on gliders and carrier-borne airplanes.

From the foregoing, it must be evident that the invention herein described is capable of a large range of modifications within the spirit of the invention.

What I claim is:

1. The combination with an airplane having a pair of ailerons, of a cam mounted to rock about its longitudinal axis and for bodily shifting movement parallel to said axis, a pair of levers pivoted for independent swinging movement about said axis and held against lateral movement, operating connections from the levers to the ailerons, said cam having means that position the levers to prevent end thrusts on the cam, when said levers and the ailerons are in normal positions and for common rocking movement with the cam on either side of normal position to raise either one of the ailerons and lower the other, said cam having other means, when said cam is moved bodily in one direction, to operate the levers and simultaneously raise both ailerons and to simultaneously lower both ailerons when said bodily movement of the cam is reversed, means for rocking the cam, and other means for bodily shifting the cam.

2. The combination with an airplane having a pair of ailerons, of a rock shaft, a cam mounted on the shaft for common rocking movement therewith, but with freedom for longitudinal shifting movement thereon, a pair of levers independently pivoted on the shaft and held against lateral movement, said cam having a pair of cam slots through each of which one of the levers extends, operating connections from the levers to the ailerons, said slots having intermediate surfaces that position the lever to prevent end thrusts on the cam, when said levers and ailerons are in normal positions and for holding the levers for common rocking movement with the shaft and cam, whereby when the levers are moved to either side of normal position, one of the ailerons is raised and the other lowered, said slots having converging end portions which, when the cam is bodily shifted to position the levers therein, draw said levers toward each other and raise both ailerons, said slots also having diverging end portions which, when the cam is bodily shifted to position the levers therein, separate said levers and lower both ailerons.

3. The structure defined in claim 2 in which the ends of the cam slots have surfaces that position the levers to prevent end thrusts on the cam, when the cam has been moved bodily in one direction to operate the levers and simultaneously raise both ailerons, or when said bodily movement is reversed to operate the levers and simultaneously lower both ailerons.

4. The combination with an airplane having a pair of ailerons, of a rock shaft, means for operating the rock shaft, a cam mounted for adjustment longitudinally of the rock shaft, means for imparting said adjustment to the cam, said cam having a guide slot extending in a plane passing through the rock shaft at its longitudinal axis, a fixed arm on the rock shaft extending into the guide slot for rocking the cam coincident with the rock shaft, said cam also having a pair of diverging cam slots, a pair of angle levers pivoted to swing about the axis of the rock shaft and held against relative axial movement, said levers extending, one thereof through each cam slot with their elbows turned away from each other outwardly of the cam, whereby the free end portions of the levers are positioned for movement transversely over the guide slot, and operating connections from the levers to the ailerons.

5. The structure defined in claim 4 further including guides for the free end portions of the levers and mounted to partake of common movement with the rock shaft.

6. The structure defined in claim 4 further including guides for the free end portions of the levers, said guides extending circumferentially about the rock shaft outwardly of the cam and mounted to partake of common movement with the rock shaft, said guides being attached to the arm.

7. The structure defined in claim 4 in which the intermediate sections of the cam slots are substantially parallel to the rock shaft and in which the levers are positioned to prevent end thrusts on the cam, when said levers and the ailerons are in normal positions or when the levers are operated by rocking the cam to raise either one of the ailerons and lower the other.

8. The structure defined in claim 4 in which the end sections of the cam slots are substantially parallel to the rock shaft, and in which end sections the levers are positioned to prevent end thrusts on the cam, when the cam has been moved bodily in one direction to operate the levers and simultaneously raise both ailerons or when said bodily movement of the cam is reversed to operate the levers and simultaneously lower both ailerons.

9. The combination with an airplane having a pair of ailerons, of a rock shaft, means for operating the rock shaft, a cam mounted on the rock shaft for adjustment longitudinally thereof, means for imparting said adjustment to the cam, said cam having a guide slot extending in a plane passing through the rock shaft at its longitudinal axis, a fixed arm on the rock shaft extending into the guide slot for rocking the cam coincident with the rock shaft, said cam also having a pair of diverging cam slots between which the guide slot extends, a pair of angle levers pivoted on the rock shaft and held against relative axial movement, said levers extending, one thereof through each cam slot with their elbows turned away from each other, whereby the free end portions of the levers are positioned for movement transversely over the guide slot, and operating connections from the levers to the ailerons.

10. The structure defined in claim 9 further including a plate having at its intermediate portion a pair of axially spaced hubs mounted on the rock shaft and rigidly secured thereto with the arm extending therebetween, said levers being losely pivoted on the rock shaft between the arm and hubs and held thereby against relative axial movement and guides for the levers extending circumferentially about the cam and rigidly secured to the plate and arm.

11. The structure defined in claim 9 in which the cam slots have intermediate sections and end sections that extend substantially parallel to the rock shaft, and in which sections the levers are positioned to prevent end thrusts on the cam when the ailerons are in normal positions or when the levers are operated to rock the cam to raise either one of the ailerons and lower the other, or when the cam has been moved bodily in one direction and operated the levers to simultaneously raise both ailerons or when said bodily movement of the cam is reversed to operate the levers and simultaneously lower both ailerons.

GUY B. CARROLL.